April 24, 1934.　　　　F. M. GIVENS　　　　1,956,123
VENTILATING MECHANISM
Filed March 21, 1933　　　2 Sheets-Sheet 1
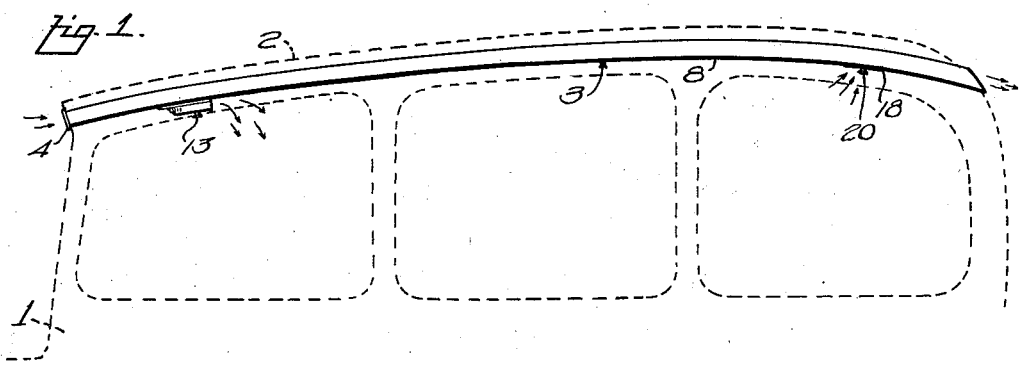
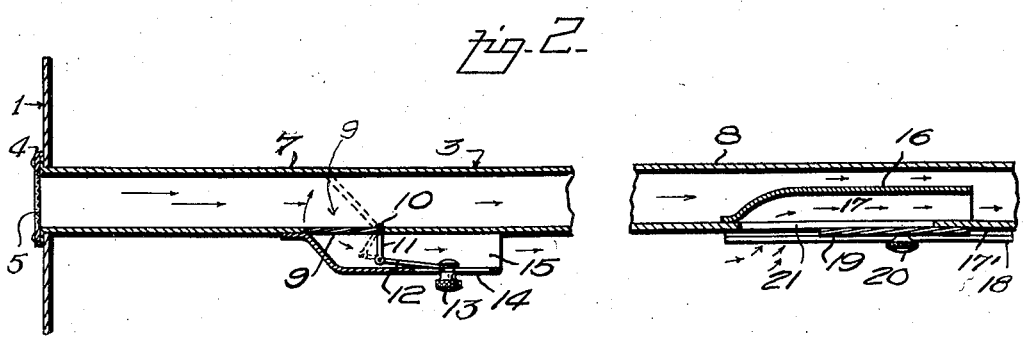
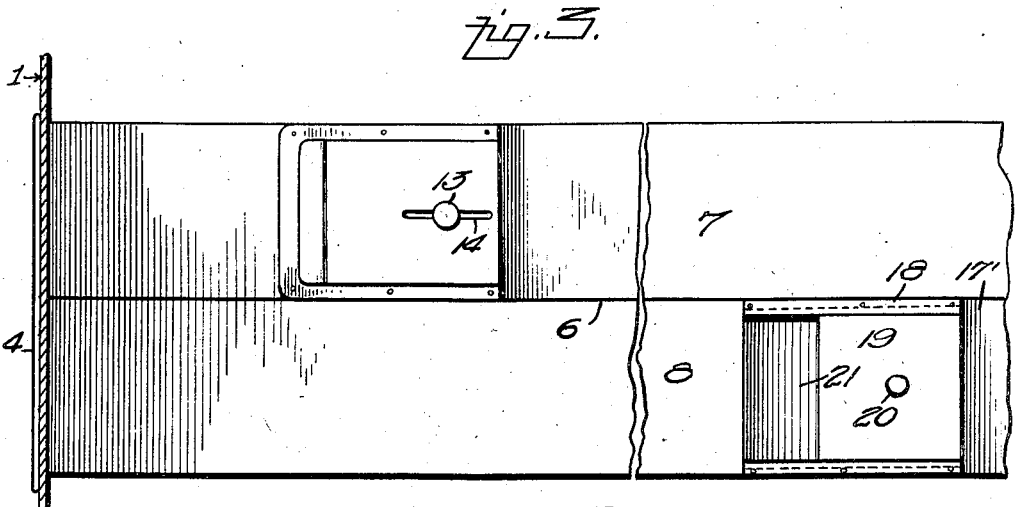
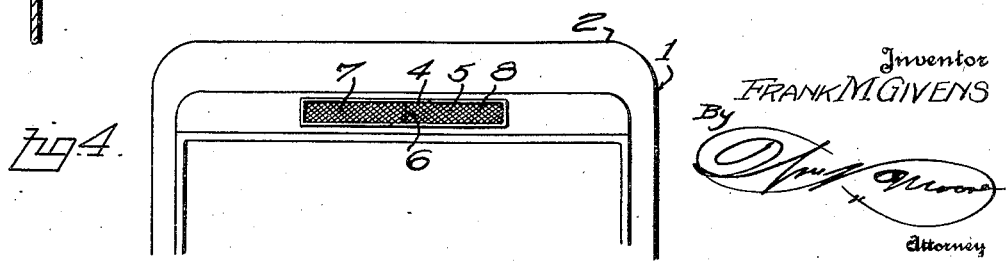
Inventor
FRANK M GIVENS
By
Attorney April 24, 1934.  F. M. GIVENS  1,956,123
VENTILATING MECHANISM
Filed March 21, 1933    2 Sheets-Sheet 2
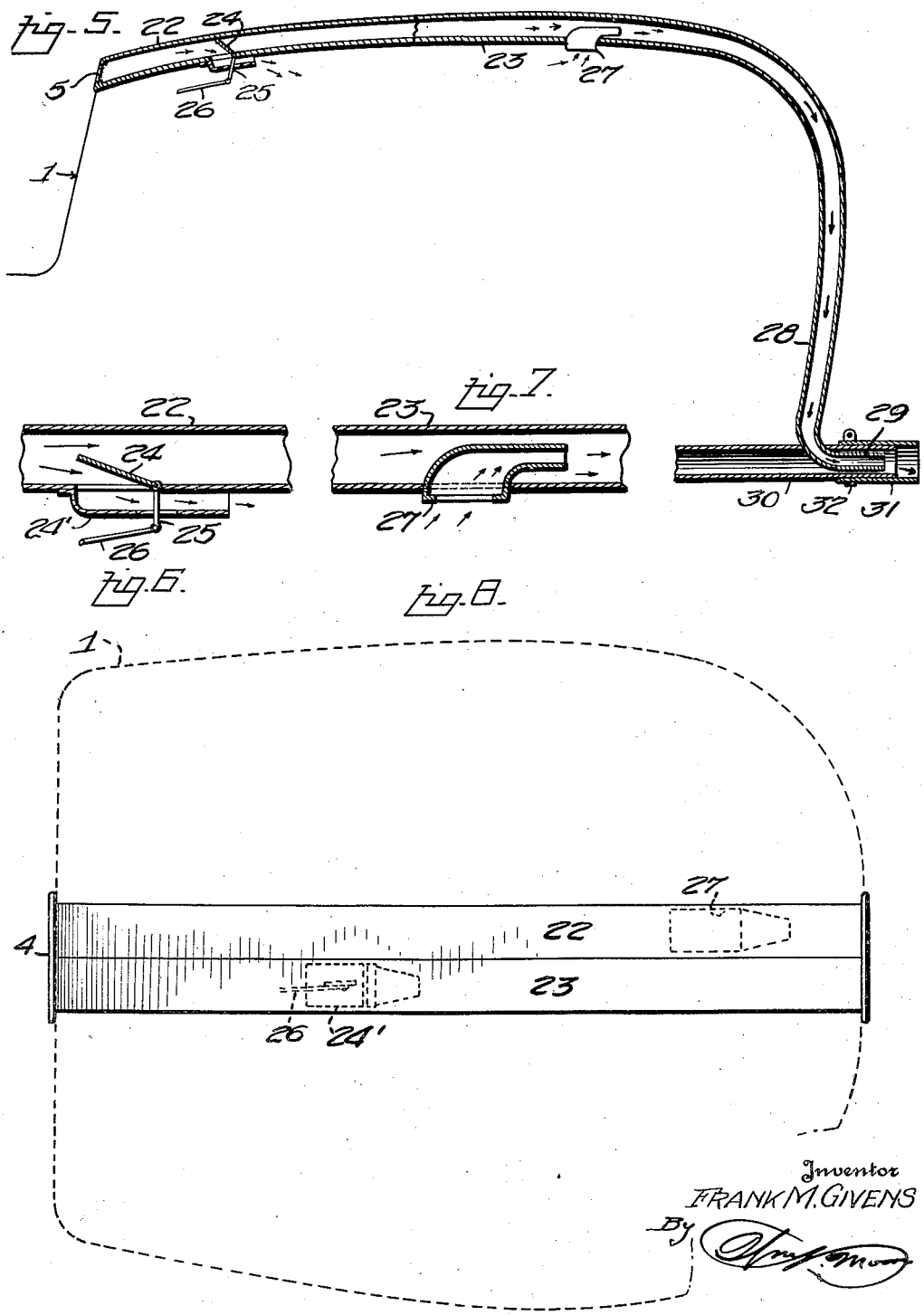

Patented Apr. 24, 1934

1,956,123

UNITED STATES PATENT OFFICE 1,956,123

VENTILATING MECHANISM

Frank M. Givens, Nashville, Tenn., assignor of one-half to Robert E. Garrett, Nashville, Tenn.

Application March 21, 1933, Serial No. 661,990

4 Claims. (Cl. 98—2)

My invention relates to improvements in ventilating mechanisms, which is particularly adapted for use in automobiles or motor vehicles, in that it possesses merit and advantages for such application, is not limited in its use, and may be applied to any character of vehicle or railway car where it would serve its functions in an efficient and practical manner.

One object of my invention is the provision of a ventilating mechanism of the character and for the purpose stated which may be applied to any suitable and convenient part of the body of the vehicle and which operates effectively under all conditions.

Another object of my invention is the provision of a ventilating mechanism which will insure a perfect supply and control of the air to suit circumstances and which will retain the air supply fresh and free from drafts.

Another object of my invention is the provision of a ventilating mechanism which can be easily applied to the vehicle and which will occupy a very small space and in no manner detract from the ornamental and attractive appearance of the vehicle.

Another object of my invention is the provision of a ventilating mechanism which will be concealed from view and which will possess every requisite to provide an efficient, desirable, useful and practical invention of this character.

To attain the desired objects my invention consists of a ventilating mechanism of the character and for the purpose described, embodying novel features of construction and combination of parts, substantially as described and claimed and as shown in the accompanying drawings, in which:

Figure 1 represents a side elevation of my ventilating mechanism shown installed in the top of an automobile or motor car, the body of the car being shown in dotted lines.

Figure 2 represents a longitudinal sectional view on an enlarged scale showing a portion of the feed or supply conduit with valve control and a part of the vacuum or suction conduit with its valve control.

Figure 3 represents a bottom plan view of the casing or conduit of my ventilating mechanism, showing clearly the control mechanism of the twin compartments of my invention.

Figure 4 represents a front end view showing the screened inlet and a portion of the vehicle as the invention is placed in the top of the body.

Figure 5 represents a longitudinal sectional view of a modified form of my invention which may be controlled from the dash or instrument board and which discharges into the exhaust of the motor.

Figure 6 represents a sectional view of a part of the casing or conduit with valve means for regulating air supply.

Figure 7 represents a sectional view of a part of the conduit with exhaust nozzle, and Figure 8 represents a top plan view of the complete modified form with body top in dotted lines.

Referring by numeral to the drawings in which the same numbers of reference denote like parts in all the views of the drawings:

The numeral 1 designates the body of the automobile in the top or roof 2 of which in the drawings is placed my ventilating mechanism 3, which extends throughout the length of the body and at its forward portion is provided with a frame or mounting 4, for a screen 5, which feeds or supplies the air to the casing or conduit of my improvement.

The conduit as stated traverses the length of the car body and by means of the division wall 6, divides the conduit into an air feed or supply compartment 7, and a vacuum or suction compartment 8, which is to say that the air enters compartment 7 and also compartment 8, but one serves to feed the fresh air while the other forms a suction medium for carrying off the foul air to effect perfect ventilation.

The compartment 7 has mounted in its fore portion the valve 9, controlling the inlet 9', and this valve in the form of a plate is pivoted at 10, and is connected with the lever 11, which is moved by the arm 12, having its inner end connected to the knob 13, movable in slot 14, of the air directing chute 15.

The compartment 8 of the conduit is provided in its lower wall with an outlet passage 21, which directs the air through the chute 16, having the outlet 17, and the outlet 21 is provided in the lower wall 17'.

This outlet is controlled by the longitudinal guides 18, which receive the slide 19, having the knob 20, for moving said slide to regulate the width of the said outlet passage 21.

From this construction it will be noted that the two compartments of my ventilating mechanism form one a feed or supply element and the other an exhaust or suction medium, and that the valve control in the feed compartment is arranged forward of the control mechanism of the suction compartment and the effect of this is, that the fresh air passes through the screen and to both compartments of the conduit but the feed compartment having its control and inlet in advance of the control and outlet of the other compartment, the effect is to direct the fresh air first into the vehicle and then by reason of the vacuum or suction action of the other compartment the foul air is discharged at the end of the car, as will be apparent from Figures 1, 2 and 3.

In the modified form of my invention shown in Figures 5, 6, 7 and 8, the conduit consists of the twin sections or compartments 22 and 23, and this form is provided with the forward flap valve 24, operated by lever 25, through the medium of rod 26, leading to the dash or instrument board, and compartment 22, is provided with the exhaust or suction nozzle 27, and in this form of my invention the conduit is formed with a discharge portion 28, terminating in an outlet nozzle 29, which leads to the exhaust pipe 30, of the motor and which may have a sliding sleeve 31, secured by clamp 32, and which allows the air to discharge into the exhaust pipe and to carry off any odor from the exhaust and also to eliminate the foul air from the car.

It will be noted that the air feed or delivery chute or spout is disposed below the conduit to direct the air downward, while the exhaust or vacuum chute or spout is within and above the lower wall of the conduit and in this manner the air is supplied down into the car and is drawn out and upward through the exhaust spout or chute which is of great importance as this insures a supply of clean fresh air and the discharge of the foul air after proper circulation through the car body.

It will also be noted that the valve construction of the feed and exhaust can be regulated to suit the desire and requirements of the occupants, and also that the valves may be arranged in any desired location and any number of such valves may be employed.

It will also be understood that my mechanism may be placed in any part of the vehicle body and may direct the air to any part of the vehicle body where found most desirable.

I claim:

1. A ventilating mechanism of the character and for the purpose described, consisting of a casing forming a conduit, a wall in said conduit forming twin sections or compartments, a valve mechanism in the foreportion of one of said sections to provide a feed control and a valve mechanism in the rear portion of the other section or compartment to form an exhaust or suction control, said valve or control means for the air supply consisting of a slide, a button or handle connected with said slide, a lever operated by said slide and a valve operated by said lever, and said section or exhaust means comprising a slide movable over an exhaust opening in the casing, guides for said slide and a nozzle located over said opening and slide.

2. A ventilating mechanism of the character and for the purpose described, consisting of a compartment or section forming a feed inlet and supply, a twin compartment forming an outlet or suction means, air inlet and outlet openings in said compartments, chutes associated with said inlet and outlet openings, and valve mechanisms for controlling said openings, said valve or control means for the air supply consisting of a slide, button or handle connected with said slide, a lever operated by said slide and a valve operated by said lever, and said suction or exhaust means comprising a slide movable over an exhaust opening in the casing, guides for said slide and a nozzle located over said opening and slide.

3. A ventilating mechanism of the character and for the purpose stated, consisting of a casing or conduit composed of twin sections, a screen covering the front end of said conduit, air inlet and control means in one of said sections and air outlet and control means in the other section, the outlet and control means being in rear of the inlet and control means, said valve or control means for the air supply consisting of a slide, a button or handle connected with said slide, a lever operated by said slide and a valve operated by said lever, and said suction or exhaust means comprising a slide movable over an exhaust opening in the casing, guides for said slide and a nozzle located over said opening and slide.

4. A ventilating mechanism of the character and for the purpose described, consisting of a casing composed of twin open sections, one formed with an air inlet and the other with an air outlet and said air outlet being in rear of said air inlet, an air directing chute leading from said inlet and arranged below the casing and projecting rearwardly, an air conducting chute leading from said outlet and consisting of a nozzle arranged within the casing, a lever operated valve means for said inlet, a slide or cut off for said outlet, said valve and slide being provided with exposed operating and control means.

FRANK M. GIVENS.